United States Patent Office 3,478,967
Patented Nov. 18, 1969

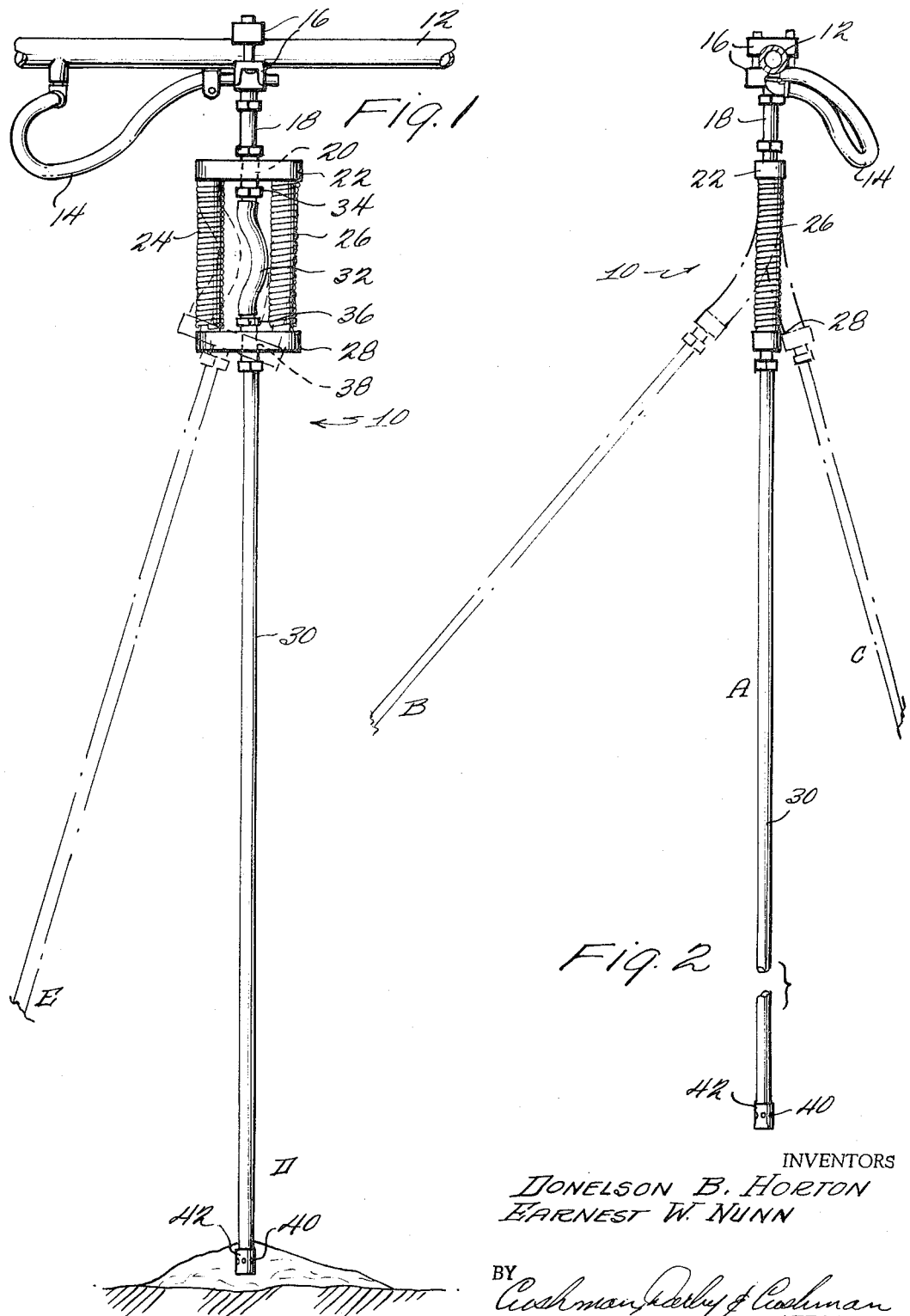

3,478,967
ROW CROP DROP
Donelson B. Horton, Madison, and Earnest W. Nunn, Huntsville, Ala., assignors to John Blue Company, a Division of Subscription Television, Inc., New York, N.Y., a corporation of Delaware
Filed Sept. 18, 1967, Ser. No. 668,386
Int. Cl. B05b 15/08
U.S. Cl. 239—588                2 Claims

ABSTRACT OF THE DISCLOSURE

The invention discloses double coil spring means to dampen and hold a row crop drop relatively free from vibration while maintaining sufficient flexibility so that said drop may yield rather than bend or break upon forceful contact with a solid object regardless of the angle of deflection.

Background of the invention

*Field of the invention.*—This invention relates to fluid sprinkling or spraying crop drop devices with an egress port member at the terminus of a flexible or deflectable flow-line, and the flow-line is provided with double spring coils mounted so as to dampen and prevent vibrations of said flow-line while enabling said flow-line to adjust or be deflected upon contact with a solid object to prevent damage to said crop drop. The invention also causes a deflected crop drop to resiliently return to its original position without undue vibrations after deflection.

*Description of prior art.*—It is well known that cultivated crops require periodic care from germination through maturity. As it is impossible to economically produce cultivated crops by manually spreading herbicides and other agricultural control or additive agents, machines have been devised to spray said agents in liquids onto the ground or onto weeds between rows of cultivated plants. Spraying is usually done by suspending egress port carrying members, known as crop drops, from booms cantilevered transversely over the crop rows. The booms extend from locomotive vehicles such as farm tractors. The crop drops may be slidably spaced along the booms so as to align with the center of the rows. Because many crops, especially corn, grow to heights in excess of five feet, it is necessary that the crop drop be of sufficient length to extend from the boom above the plants to within several inches of the ground. As many herbicides carry warnings against contact with a cultivated plant, it is not only necessary that the crop drop extend close to the ground, but also that it not be subject to any vibrations which may cause poisonous spray to carry to said plants. At the same time, the crop drop must be deflectable to avoid destructive collision when coming into contact with a fixed object, such as a rock or other protrusion above the expected ground level.

There have been many attempts in the past to provide a flexible row crop drop without sacrificing the quality of rigidity which dampens vibratory gyrations. The best illustration of such as attempt is disclosed in Patent 3,235,187 to Merritt. This patent discloses a drop stabilizer consisting of two converging steel rod members located on each side of a flexible hose. The steel rod members are securely mounted to a boom and extend downwardly to straddle the hose and to securely suspend a nozzle between the rod members at the terminus of the drop. Merritt discloses that these stabilizers "move only forwardly and rearwardly with the respect to the path of travel of said agricultural vehicle, and not laterally." The present invention overcomes the disadvantages of laterally fixed crop drops and increases the amount of dampening control for crop drops, as compared with the prior art.

The disadvantages of the Merritt-type drop are twofold. First, if such a drop should strike a fixed object, such as a rock, from any direction other than that in the line of travel, stress is placed upon the rod members which are specifically designed to prevent lateral movement. Such resistance can cause the nozzle to be damaged. Since the danger of striking a fixed object is greatest when the tractor or similar machine is turning at the end of each row, and since the line of travel of crop drops at this time is generally lateral as the crop drop pivots around the tractor, the disadvantages of the Merritt stabilizer become readily apparent.

A second disadvantage to the Merritt type of stabilizer is that relatively thin rods of spring steel rarely prevent vibrations of the nozzle but rather tend to perpetrate a swinging movement. When the long spring steel rods bend on contact with a fixed object, and then spring back, the spring tends to be generated over the entire length of each rod. Thus, the nozzle at the bottom of the rod is essentially whipped back and forth as each rod repositions itself. Although it is true that vibrations in the direction of travel of the tractor are not as harmful as lateral vibrations, excessive vibrations, or a swinging or gyrating motion, will cause spray and spray mist to be tossed into the air. This, understandably, increases the possibility of liquid reaching overhanging plant leaves or being blown upon the plant itself. The present invention utilizes a relatively rigid crop drop which is hinged at the top by means of coil springs. The arrangement of the springs is such as to damped any vibrations of the nozzle and yet enable the crop drop to be deflected in any direction upon contact with a solid object. The stiffness of the coil spring hinges, coupled with the dead weight of drop and nozzle, all but eliminate undesirable back-swing motion.

Summary of the invention

A row crop drop is disclosed which comprises a rigid egress port carrying member such as a pipe, being capable of 90° deflection by reason of coil spring hinges connecting said member to a boom upon which said member and coil springs are mounted.

One object of said invention is to limit swing, gyrations and vibrations of the egress port or nozzle on a row crop drop.

Another object is to enable said egress port to be capable of deflection about a fixed object without damaging said egress port.

Still further objects and the entire scope of applicability of the present invention will become apparent from a detailed description given hereinafter; it should be understood, however, that the detailed description and specific examples are indicating preferred embodiments of the invention, are given by way of illustration only, since various changes or modifications within the scope of the invention will become apparent to those skilled in the art from this detailed description.

Brief description of the drawings

The invention will be understood more readily by reference to the following examples; however, these examples are intended to illustrate the invention and are not to be construed to limit the scope of the invention.

FIGURE 1 is a front plan view of the crop drop with phantom lines indicating lateral side deflection, and FIGURE 2 is a side plan view of the crop drop with phantom lines indicating forward and rearward deflection.

Description of the preferred embodiments

Referring now to the drawings, applicant's crop drop 10 is shown to be secured to a conventional hollow boom 12 which extends outwardly from a farm tractor or similar means of locomotion (not shown) to traverse several rows of cultivated crops. The liquids which are to be sprayed between the crop rows flow from receptacles (not shown) through boom 12 into individual hose conduits 14 which connect the boom to the separate crop drops. The flow of liquid continues through the bottom portion of sliding U-clamp 16, into hollow pipe 18.

The sliding U-clamp 16 rigidly secures pipe 18 to boom 12 at any desired position along the boom.

The lower terminus of pipe 18 mates with a passageway 20 through bracket 22 in such a fashion that while liquid may flow through the bracket, the bracket itself is fixedly positioned below and substantially parallel to the boom 12.

Suspended beneath each end bracket 22 are two close wound helical compression springs with high initial tension. These springs are designated 24 and 26, and can be seen to be held in relationship to each other by a second bracket 28 which is fixedly secured to a long crop drop dispensing pipe 30.

After liquid has emerged from passageway 20 it flows through a flexible hose 32 which fits tightly over a nipple 34 depending from beneath upper bracket 22 and connects with a nipple 36 rising from the lower bracket 28. The hose is positioned midway between the coil springs 24 and 26. The flow then continues through passageway 38 in lower bracket 28 into pipe 30, finally emerging through egress ports 40 in nozzle means 42 in a controlled spray.

Thus it can be seen that liquid flows from a depository (not shown) through pipe 12 and hose 14, passing through clamp 16 and pipe 18; continuing through passageway 20 in upper bracket means 22 down through flexible hose 32 flowing through the lower bracket means 28 within the passageway 38 into dispensing pipe 30, passing down to nozzle 42 and spraying onto the ground through apertures 40 in said nozzle.

FIGURES 1 and 2 illustrate the advantages of the twin spring assembly. FIGURE 2 shows what happens when the drop hits an obstruction in the line of travel. The drop is shown in position A as it would normally be carried by a boom moving from left to right. When the boom strikes an obstruction, the resistance to deflection will be relatively light and the drop will deflect rearwardly (toward position B) to pass over the obstruction. Having passed the obstruction the drop will swing forwardly toward position C, quickly returning to its original A position.

FIGURE 1 shows that the drop can be laterally deflected in a direction not perpendicular to the boom, but due to the high initial tension of the springs and the fact that the two springs are aligned side by side, the force required is much greater than that required for a similar generally perpendicular deflection. Thus it can be seen that where the boom is not moving in a line generally perpendicular to the line of travel, such as occurs when a tractor is making a turn, and the drop strikes a fixed object, the drop which is normally in position D can be deflected toward a side lateral position such as E. The double action resulting from spring 24 compressing and spring 26 stretching will cause the drop to rapidly return to position D with only a minimum dampened backswing.

It will be well understood that while the drawings illustrate the advantages of a plurality of high tension springs in combination with a rigid pipe, and while the location of twin springs illustrate the preferred embodiment of the invention, the drawings are not intended to limit the invention to these specific features. One alternative to the preferred embodiment would be to position a second set of brackets across and perpendicular to the first so that there would be a double spring action controlling forward and rearward motion as well as any lateral side motion of the crop drop.

The illustrated embodiment is preferred because it is felt to best meet the dual requirements of controlled flexibility. It will be recalled that these requirements call for enough flexibility to easily deflect the crop drop over obstacles while retaining sufficient rigidity to prevent swinging or vibratory motion which might cause spray to be carried to the plants. Since a forward and rearward swinging motion such as is illustrated in FIGURE 2 moves the crop drop spraying apparatus generally parallel to the plants along the middle of the row, it is not as important to dampen the movement as it is where the drop is swinging from side to side as illustrated in FIGURE 1 thus moving the spray nozzle closer to the plants and increasing the possibility of an undesired spraying of the plants. On the other hand, it is desirable for the crop drop to be deflected with minimum effort over any obstacle to reduce the possibility of damage to said spraying apparatus. The preferred embodiment combines the most desirable alternatives. The action of the high initial tension springs in FIGURE 1 allows the drop to be easily deflected and returned to its original position with minimum swinging motion, thus placing a premium on the flexibility while maintaining required dampening qualities. At the same time, the side by side arrangement of the springs allows the crop drop to be deflected laterally but returns it to its original spraying position with virtually no backspring, thus placing a premium on dampening the motion of the crop drop and preventing unnecessary closure of distances between the crop drop and the plants. At the same time limited flexibility is maintained to prevent damage to crop drop.

In addition to the number and relationship of the springs, the desired flexibility and dampening qualities of the invention are enhanced by the location of the spring hinge at the top of a long rigid pipe. The weight and rigidity of the pipe aid in returning and maintaining the position of the pipe generally perpendicular to the ground. This rigidity further eliminates a natural whipping action often found in long, flexible or resilient, crop drops.

We claim:

1. In agricultural spraying apparatus of the type including a row crop drop which can be suspended essentially vertically downwardly from a boom for dispensing a liquid treating agent in close proximity to the earth or to plant life, the improvement in said row crop drop comprising:

upper and lower brackets for connecting the row crop drop to the boom, said upper bracket being substantially rigidly affixed to said boom by connecting means, and said lower bracket being rigidly connected to an elongated dispensing member, a relatively long elongated dispensing member in the form of a rigid tubular member having a passageway therethrough for conveying liquids to a lower end of the elongated dispensing member, and including a dispensing nozzle at the lower end of the elongated dispensing member for spraying liquids onto plants or the earth, a resilient hinge means positioned substantially vertically between said upper and lower brackets, said resilient hinge means being made up of a plurality of helical spring means which are arranged so that the lower end of the elongated dispensing member can be deflected in any direction, but with the arrangement being such that there is greater resistance to deflection movements of the elongated dispensing member in directions lateral to the path of movement of the boom to which it is attached as compared to directions in line with said path of movement, said resilient hinge means also functioning to dampen vibrations which develop when said elongated dispensing member is deflected, and conduit means to conduct liquid from a source of supply to said elongated dispensing member, said conduit means being sufficiently flexible between said upper and lower brackets to enable said spring means to bend and stretch.

2. An agricultural spraying apparatus as claimed in claim 1 wherein the number of springs in the resilient hinge means is two.

References Cited

UNITED STATES PATENTS 2,706,133  4/1955  North et al. _____ 239—588
2,907,811  10/1959  Mason _____ 248—63
3,111,552  11/1963  Cox et al. _____ 248—61
3,235,187  2/1966  Merritt _____ 239—588

EVERETT W. KIRBY, Primary Examiner

U.S. Cl. X.R.

239—169, 175, 176; 248—63